(12) United States Patent
Chen et al.

(10) Patent No.: US 7,169,846 B2
(45) Date of Patent: *Jan. 30, 2007

(54) PROCESS FOR IMPROVING WATER-WHITENING RESISTANCE OF PRESSURE SENSITIVE ADHESIVES

(75) Inventors: Augustin T. Chen, Cheshire, CT (US); Jong-Shing Guo, Longmeadow, MA (US); Tibor Pernecker, Wilbraham, MA (US)

(73) Assignee: Cytec Surface Specialties, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/142,455

(22) Filed: May 10, 2002

(65) Prior Publication Data

US 2003/0100670 A1    May 29, 2003

Related U.S. Application Data

(60) Provisional application No. 60/323,984, filed on Sep. 21, 2001, provisional application No. 60/305,174, filed on Jul. 13, 2001.

(51) Int. Cl.
*C09J 141/00* (2006.01)
*C09J 133/02* (2006.01)
*C09J 133/06* (2006.01)
*C09J 129/12* (2006.01)

(52) U.S. Cl. .................. 524/817; 524/561; 524/609; 524/833; 524/556; 523/177; 525/328.5; 525/328.9; 525/329.7; 525/330.2; 525/330.8

(58) Field of Classification Search ............. 524/833, 524/832, 556, 561, 609, 817; 526/931; 523/177; 525/328.5, 328.9, 329.7, 330.2, 330.8
See application file for complete search history.

(56) References Cited

U.S. PATENT DOCUMENTS

| 4,814,514 | A | 3/1989 | Yokota et al. |
| 5,286,843 | A | 2/1994 | Wood |
| 5,332,854 | A | 7/1994 | Yokota et al. |
| 5,496,603 | A | 3/1996 | Riedel et al. |
| 5,620,796 | A | 4/1997 | Kawabata et al. |
| 5,928,783 | A * | 7/1999 | Phan et al. ............ 428/355 EN |
| 6,013,722 | A | 1/2000 | Yang et al. |
| 6,190,767 | B1 | 2/2001 | Ishikawa et al. |
| 6,239,240 | B1 * | 5/2001 | Schultz et al. .............. 526/277 |

FOREIGN PATENT DOCUMENTS

| EP | 0554832 A | 8/1993 |
| EP | 0971010 A1 | 1/2000 |
| JP | 2596441 B2 | 4/1989 |
| JP | 06-65551 A2 | 3/1994 |
| JP | 06065551 A * | 3/1994 |
| JP | 09-278837 A2 | 10/1997 |
| JP | 09278837 A * | 10/1997 |
| WO | WO 97/11996 A1 | 4/1997 |
| WO | WO 9802497 A | 1/1998 |
| WO | WO 00/61670 A1 | 10/2000 |
| WO | WO 01/85867 A1 | 11/2001 |

* cited by examiner

*Primary Examiner*—Kelechi C. Egwim
(74) *Attorney, Agent, or Firm*—Lathrop & Gage LC

(57) ABSTRACT

Pressure sensitive adhesive compositions having enhanced resistance to water-whitening comprising an aqueous emulsion polymer are disclosed. The polymer comprises the polymerization reaction product of a polymerizable aqueous emulsion comprising: (i) at least one hydrophobic alkyl acrylate or alkyl methacrylate ester of an alcohol, (ii) at least about 1 wt. % of at least one hydrophilic monomer, (iii) at least about 5 wt. % of at least one partially hydrophilic alkyl acrylate or alkyl methacrylate ester of an alcohol, and (iv) a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, and the average particle size of the polymer is less than or equal to 200 nm. Also disclosed are processes for preparing same.

23 Claims, 1 Drawing Sheet

US 7,169,846 B2

PROCESS FOR IMPROVING WATER-WHITENING RESISTANCE OF PRESSURE SENSITIVE ADHESIVES

CROSS REFERENCE TO RELATED APPLICATION

This application is a nonprovisional application which claims the priority of prior provisional applications Ser. No. 60/305,174, filed Jul. 13, 2001 and Ser. No. 60/323,984, filed Sep. 21, 2001, the disclosures of which are incorporated herein by reference.

BACKGROUND OF THE INVENTION

This invention relates to pressure sensitive adhesives based on aqueous emulsions and processes for preparation of the adhesives. The pressure sensitive adhesives of the invention have enhanced resistance to water-whitening.

These pressure sensitive adhesives are particularly suitable for applications that require that the pressure sensitive adhesive maintain adhesion between the substrate and facestock when subjected to hot water spraying or immersion. Hot water adhesion is required in applications such as bottle labels where the bottles are subjected to hot water spraying in washing operations. In general, resistance to water-whitening is desirable anywhere a pressure sensitive adhesive with transparent facestock or substrate is subjected to water or high humidity. Examples include labels on the sides of trucks, signs and bottles.

Methods of providing water-whitening resistant latex emulsions for use in pressure sensitive adhesives are disclosed in the art. U.S. Pat. No. 5,286,843 discloses a process for improving the water-whitening resistance of pressure sensitive adhesives containing an aqueous latex emulsion and water soluble ions by removing the water soluble ions and adjusting the pH to at least about 6. The patent discloses that water soluble ions may be removed by a number of techniques including centrifugation, dialysis, precipitation and deionization with ion exchange resins. The preferred method of removing the water soluble ions is to contact the aqueous latex emulsion, the formulated pressure sensitive adhesive containing the aqueous emulsion or both with an ion exchange resin. International Publication No. WO 97/11996 discloses a process for preparing hot water-whitening resistant latex emulsions useful in pressure sensitive adhesive compositions. The process involves copolymerizing a monomer mixture containing at least one alkyl acrylate ester of an alcohol containing at least 4 carbon atoms, at least one polar co-monomer, and at least one partially water-soluble co-monomer present in an amount of at least about 7 wt. %. Polymerization is carried out in the presence of at least one nonionic surfactant containing at least 8 moles of ethylene oxide and at least one anionic surfactant containing up to about 10 moles of ethylene oxide. The polymerization product is neutralized to produce an emulsion having a pH greater than 7 and containing particles having a volume average particle size diameter up to about 165 nm. An electrolyte may be added subsequent to polymerization to stabilize opacity of a film cast from the emulsion. International Publication No. WO 00/61670 discloses a process for preparing an aqueous latex emulsion for use in pressure sensitive adhesives that maintain adhesion in hot water environments in addition to exhibiting enhanced resistance to water-whitening. The process involves preparing an aqueous latex emulsion from a monomer mixture consisting essentially of at least one alkyl acrylate having at least 4 carbon atoms in the alkyl chain, at least one ethylenically unsaturated carboxylic acid, and at least one styrenic monomer, the polymerization being carried out in the presence of at least one anionic surfactant and a redox type free radical initiator system. The aqueous latex emulsion prepared according to the process of WO 00/61670 is disclosed to have polymer particles with a mean particle size diameter of less than or equal to about 100 nm. None of the above patents/publications disclose preparing pressure sensitive adhesives wherein a polymerizable surfactant is used.

U.S. Pat. Nos. 5,928,783 and 6,239,240 disclose processes for preparing aqueous emulsion polymers that have application as pressure sensitive adhesives. The polymers are prepared by reacting at least one ethylenically unsaturated monomer and a polymerizable surfactant having a terminal allyl amine moiety. Neither patent discloses preparation of pressure sensitive adhesives having enhanced resistance to water-whitening.

SUMMARY OF THE INVENTION

It is an object of this invention to provide pressure sensitive adhesive ("PSA") compositions having enhanced resistance to water-whitening. It is another object of this invention to provide a process(es) for preparing pressure sensitive adhesives having enhanced resistance to water-whitening.

These and other objects are achieved in the invention which is described in more nonlimiting detail hereinafter.

According to the invention, a process for preparing a pressure sensitive adhesive having enhanced resistance to water-whitening is provided comprising: (a) forming a polymerizable aqueous pre-emulsion comprising: (i) at least one hydrophobic alkyl acrylate or alkyl methacrylate ester of an alcohol, (ii) at least about 1 wt. % of at least one hydrophilic monomer, (iii) at least about 5 wt. % of at least one partially hydrophilic alkyl acrylate or alkyl methacrylate ester of an alcohol, and (iv) a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii) in the pre-emulsion; (b) contacting water, an effective amount of a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, and an initial amount of polymerization initiator to form a mixture; (c) continuously adding the pre-emulsion to the mixture of (b) to polymerize the pre-emulsion to form a latex emulsion, wherein additional polymerization initiator is added during the polymerization of the pre-emulsion; and (d) adjusting the pH of the latex emulsion with a suitable base to a pH of about 6.5 to about 9; wherein the effective amount of water-soluble or water-dispersible polymerizable surfactant in the mixture of (b) is that amount necessary to produce pressure sensitive adhesive having an average particle size of less than or equal to 200 nm.

Further according to the invention, a process for preparing a pressure sensitive adhesive having enhanced resistance to water-whitening is provided comprising: (a) contacting water, an effective amount of a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, and an initial amount of polymerization initiator to form a mixture; (b) continuously adding monomers and, optionally, additional water to the mixture and polymerizing the resultant emulsion to form a latex emulsion, wherein additional polymerization initiator is added during the polymerization of the emulsion, and wherein the monomers comprise: (i) at least one hydrophobic alkyl acrylate or alkyl methacrylate ester of an alcohol, (ii) at least about 1 wt. % of at least one hydrophilic monomer, (iii) at least about 5 wt. % of at least one partially hydrophilic alkyl acrylate or alkyl methacrylate ester of an alcohol, and (iv) a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii); and (c) adjusting the pH of the latex emulsion with a suitable base to a pH of about 6.5 to about 9; wherein the effective amount of water-soluble or water-dispersible polymerizable surfactant in the mixture is that amount necessary to produce the pressure sensitive adhesive having an average particle size of less than or equal to 200 nm.

Further according to the invention, pressure sensitive adhesive compositions having enhanced resistance to water-whitening comprising an aqueous emulsion polymer are provided, the polymer comprising the polymerization reaction product of a polymerizable aqueous emulsion comprising: (i) at least one hydrophobic alkyl acrylate or alkyl methacrylate ester of an alcohol, (ii) at least about 1 wt. % of at least one hydrophilic monomer, (iii) at least about 5 wt. % of at least one partially hydrophilic alkyl acrylate or alkyl methacrylate ester of an alcohol, and (iv) a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii); wherein after the polymerization the pH of the polymer is adjusted to a pH of about 6.5 to about 9, and the average particle size of the polymer is less than or equal to 200 nm.

Still further according to the invention, pressure sensitive adhesives having enhanced resistance to water-whitening produced by the process(es) described above are provided.

Optionally included in the process of the invention is the addition of a vinyl ester of a $C_2$ to $C_{10}$ carboxylic acid to the latex emulsion after the conversion of monomers (i), (ii) and (iii) is greater than 90%. The invention also optionally provides pressure sensitive adhesives wherein the polymerization reaction product further comprises a vinyl ester of a $C_2$ to $C_{12}$ carboxylic acid that is added to the polymerization reaction product after the conversion of monomers (i), (ii) and (iii) is greater than 90%.

BRIEF DESCRIPTION OF THE DRAWINGS

In describing the invention, reference will be made to FIG. 1 which is a graph showing the change in absorbance over a 24 hour period of direct- and transfer-coated pressure sensitive adhesives of the invention (curves 1 and 2) versus a control pressure sensitive adhesive prepared using conventional surfactants (curve 3).

DETAILED DESCRIPTION OF THE INVENTION

Figure 1:
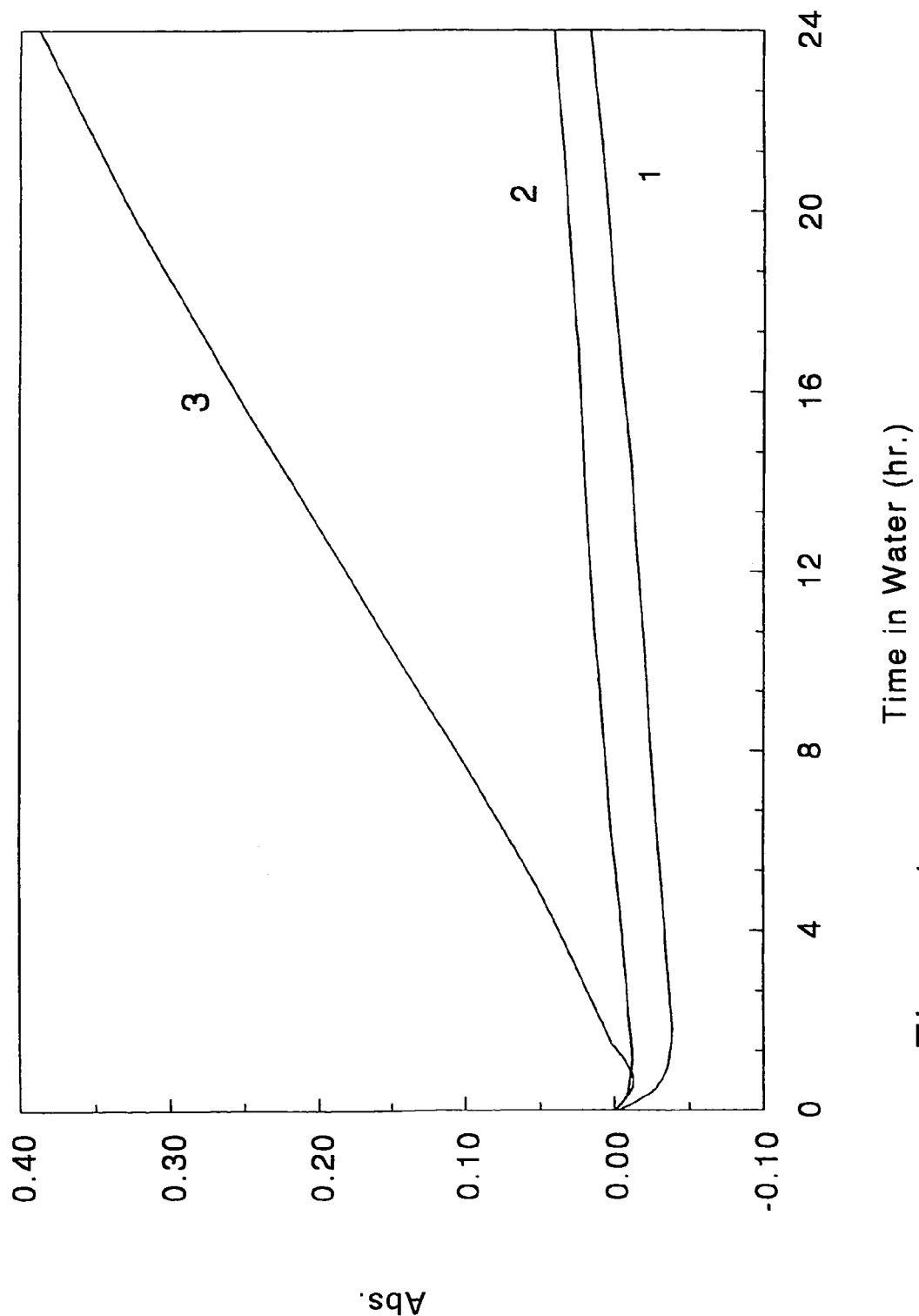

This invention provides aqueous emulsion pressure sensitive adhesives useful in the production of products such as labels, decals and the like, particularly label and decal facestock that are at least partially transparent, and are subject to water or high humidity during use. The pressure sensitive adhesives of the invention are particularly useful in bottle label applications where the labeled bottles are subject to hot water environments.

The pressure sensitive adhesives of the invention exhibit enhanced resistance to water-whitening. The extent of water-whitening can be determined visually or by using UV/Visible spectroscopy measuring absorbance as a function of time. As used herein, the PSA's of the invention were determined to have an acceptable level of water whitening of the PSA film when (a) the increase of absorbance was less than 0.2, preferably less than 0.05, after 24 hour room temperature water immersion (as determined by UV/Visible spectroscopy), and/or (b) there was no visible change after 30 min. immersion in 190° F. (87.8° C.) water.

A first embodiment of the invention relates to a process for preparing a pressure sensitive adhesive having enhanced resistance to water-whitening comprising:

(a) forming a polymerizable aqueous pre-emulsion comprising: (i) at least one hydrophobic alkyl acrylate or alkyl methacrylate ester of an alcohol, (ii) at least about 1 wt. % of at least one hydrophilic monomer, (iii) at least about 5 wt. % of at least one partially hydrophilic alkyl acrylate or alkyl methacrylate ester of an alcohol, and (iv) a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii) in the pre-emulsion; (b) contacting water, an effective amount of a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, and an initial amount of polymerization initiator to form a mixture; (c) continuously adding the pre-emulsion to the mixture of (b) to polymerize the pre-emulsion to form a latex emulsion, wherein additional polymerization initiator is added during the polymerization of the pre-emulsion; and (d) adjusting the pH of the latex emulsion with a suitable base to a pH of about 6.5 to about 9; wherein the effective amount of water-soluble or water-dispersible polymerizable surfactant in the mixture of (b) is that amount necessary to produce pressure sensitive adhesive having an average particle size of less than or equal to 200 nm, preferably less than or equal to 100 nm.

A second embodiment of the invention relates to a process for preparing a pressure sensitive adhesive having enhanced resistance to water-whitening comprising:

(a) contacting water, an effective amount of a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, and an initial amount of polymerization initiator to form a mixture; (b) continuously adding monomers and, optionally, additional water to the mixture and polymerizing the resultant emulsion to form a latex emulsion, wherein additional polymerization initiator is added during the polymerization of the emulsion, and wherein said monomers comprise: (i) at least one hydrophobic alkyl acrylate or alkyl methacrylate ester of an alcohol, (ii) at least about 1 wt. % of at least one hydrophilic monomer, (iii) at least about 5 wt. % of at least one partially hydrophilic alkyl acrylate or alkyl methacrylate ester of an alcohol, and (iv) a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii) added to the mixture; and (c) adjusting the pH of the latex emulsion with a suitable base to a pH of about 6.5 to about 9; wherein the effective amount of water-soluble or water-dispersible polymerizable surfactant in the mixture is that amount necessary to produce the pressure sensitive adhesive having an average particle size of less than or equal to 200 nm, preferably less than or equal to 100 nm.

Hydrophobic alkyl acrylate or alkyl methacrylate ester monomers that can be employed according to the invention include alkyl acrylate or alkyl methacrylate esters of an alcohol wherein the alkyl portion of the alcohol is linear or branched and contains at least 4 carbon atoms. The alkyl groups of the alkyl acrylate or alkyl methacrylate monomers are preferably linear or branched alkyl radicals having from 4 to about 14 carbon atoms, more preferably from 4 to about 10 carbon atoms, and most preferably from 4 to about 8 carbon atoms. Examples of this class of monomers include, but are not limited to, isooctyl acrylate, 4-methyl-2-pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures of two or more.

The currently preferred hydrophobic monomers are 2-ethylhexyl acrylate, n-butyl acrylate, and mixtures thereof.

The amount of hydrophobic alkyl acrylate or alkyl methacrylate ester monomers based on the total weight of monomers (i), (ii) and (iii) is preferably about 70 to about 90 wt. %, and more preferably about 75 to about 85 wt. %.

Hydrophilic monomers that can be employed according to the invention are monomers that are copolymerizable with the hydrophobic monomer and that are water soluble. The hydrophilic monomers are selected from monoolefinic monocarboxylic acids, monoolefinic dicarboxylic acids, or mixtures thereof.

Examples of suitable hydrophilic monomers include, but are not limited to, acrylic acid, methacrylic acid, fumaric acid, maleic acid, itaconic acid, crotonic acid, oligomeric acrylic acid, and mixtures thereof. The currently preferred acids are acrylic acid, methacrylic acid, and mixtures thereof.

The amount of hydrophilic monomers based on the total weight of monomers (i), (ii) and (iii) is at least about 1 wt. %, preferably about 2 to about 10 wt. %, more preferably about 3 to about 10 wt. %, and most preferably about 4 to about 8 wt. %.

Partially hydrophilic alkyl acrylate or alkyl methacrylate ester monomers that can be employed according to the invention include alkyl acrylate or alkyl methacrylate esters of an alcohol wherein the alkyl portion of the alcohol has 1 to 2 carbon atoms. The partially hydrophilic monomers can also be referred to as partially water soluble monomers.

Examples of suitable partially hydrophilic monomers include methyl acrylate, methyl methacrylate, ethyl acrylate, and mixtures thereof. The currently preferred acids are methyl acrylate, methyl methacrylate, and mixtures thereof, with methyl acrylate being currently most preferred.

The amount of partially hydrophilic monomers based on the total weight of monomers (i), (ii) and (iii) is at least about 5 wt. %, preferably about 5 to about 20 wt. %, more preferably about 5 to about 18 wt. %, and most preferably about 10 to about 16 wt. %.

Water-soluble or water-dispersible polymerizable surfactants having a terminal allyl amine moiety that can be employed according to the invention include those polymerizable surfactants disclosed in U.S. Pat. Nos. 5,928,783 and 6,239,240, which are incorporated herein by reference in their entirety. Preferably, the polymerizable surfactants of the invention contain a hydrophilic portion selected from a sulfonate allyl amine moiety, a sulfate allyl amine moiety, or a phosphate allyl amine moiety, and a hydrophobic portion selected from —R, or a group having the formula RO—$(CH_2CH_2O)_n$—; wherein R is an alkyl group or an alkyl-substituted phenyl group wherein the alkyl group has 1 to 20 carbon atoms, preferably 10 to 18 carbon atoms, and n is an integer from 2 to 100, preferably 2 to 15. The hydrophilic portion and the hydrophobic portion are connected by means of a covalent bond. Combinations of such polymerizable surfactants can be used in preparing the polymers of the invention. The water-soluble or water-dispersible polymerizable surfactants having a terminal allyl amine moiety useful in the invention are available from Stepan Company under the Polystep® NMS trademark.

Suitable water-soluble or water-dispersible polymerizable surfactants having a terminal allyl amine moiety include, but are not limited to, the following examples.

A preferred polymerizable surfactant is an allyl amine salt of an alkyl benzene sulfonate having the formula

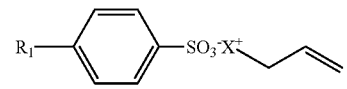

wherein $R_1$ is an alkyl group having 1 to 20 carbon atoms, preferably 10 to 18 carbon atoms, and $X^+$ is selected from $^+NH_3$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$. An example of a polymerizable surfactant of this type is an allyl amine salt of dodecylbenzene sulfonate.

Another preferred polymerizable surfactant is an allyl amine salt of an alkyl ether sulfate having the formula

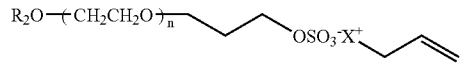

wherein $R_2$ is an alkyl group having 1 to 20 carbon atoms, preferably 10 to 18 carbon atoms, n is an integer from 2 to 100, preferably 2 to 15, and $X^+$ is selected from $NH_3^+$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$. An example of a polymerizable surfactant of this type is an allyl amine salt of laureth sulfate.

Another preferred polymerizable surfactant is an allyl amine salt of a phosphate ester having the formula

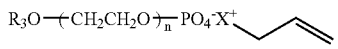

wherein $R_3$ is an alkyl or alkyl-substituted phenyl group wherein the alkyl group has 1 to 20 carbon atoms, n is an integer from 2 to 100, preferably 2 to 15, and $X^+$ is selected from $^+NH_3$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$. An example of a polymerizable surfactant of this type is an allyl amine salt of nonylphenol ethoxylate (9 moles EO) phosphate ester.

Yet another preferred polymerizable surfactant is an allyl amine salt of a sulfate having the formula

wherein $R_6$ is an alkyl group having 6 to 20 carbon atoms, preferably 10 to 18 carbon atoms, and $X^+$ is selected from $^+NH_3$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$.

The substituted phenyl compounds having at least one alkenyl substituent that can be employed as water-soluble or water dispersible polymerizable surfactants according to the invention include those disclosed in U.S. Pat. No. 5,332,854, which is incorporated herein by reference in its entirety.

Suitable substituted phenyl compounds having at least one alkenyl substituent include compounds having the formula:

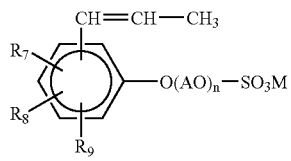

wherein $R_7$ is an alkyl, alkenyl or aralkyl group containing 6 to 18 carbon atoms; $R_8$ is a hydrogen atom or an alkyl, alkenyl or aralkyl group containing 6 to 18 carbon atoms; $R_9$ is a hydrogen atom or a propenyl group; A is an unsubstituted or substituted alkylene group of 2 to 4 carbon atoms; n is an integer of 1 to about 200, preferably 2 to about 100; and M is an alkali metal, an ammonium ion or an alkanolamine residue.

In the substituted phenyl compounds of the invention, the alkyl, alkenyl and aralkyl groups of $R_7$ and $R_8$ are independently selected and may be the same or different. Suitable alkyl groups include, but are not limited to, hexyl, heptyl, octyl, nonyl, decyl, undecyl, dodecyl, tridecyl, tetradecyl, pentadecyl, hexadecyl, heptadecyl and octadecyl. Suitable alkenyl groups include, but are not limited to, hexenyl, heptenyl, octenyl, nonenyl, decenyl, undecenyl, dodecenyl, tridecenyl, tetradecenyl, pentadecenyl, hexadecenyl, heptadecenyl and octadecenyl. Suitable aralkyl groups include, but are not limited to, styryl, benzyl and cumyl.

The propenyl group may occur as trans- and cis-isomers. For the purposes of the present invention, these isomers may be used independently or as a mixture.

For A, suitable unsubstituted or substituted alkylene groups include, for example, ethylene, propylene, butylene, and isobutylene. The polyoxyalkylene group —$(AO)_n$— can be a homo-, block or random polymer, or a mixture thereof.

The conditions of the reaction for producing the substituted phenyl surfactant of the present invention are not critical. For example, the substituted phenyl surfactant can be produced by adding an alkylene oxide such as ethylene oxide (EO) or propylene oxide (PO) to an alkylated propenyl phenol in the usual manner, sulfating the addict with a sulfating agent such as sulfuric acid, sulfamic acid, chlorosulfonic acid, or the like, followed by neutralizing with an alkaline substance.

A currently preferred group of substituted phenyl compounds are those compounds having the formula:

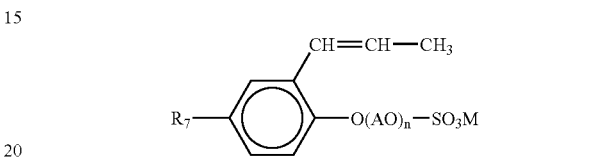

wherein $R_7$, A, M and n is as defined above. More preferred compounds are those wherein $R_7$ is alkyl, A is ethylene (—$CH_2CH_2$—), and M is alkali metal or ammonium. Most preferred compounds are those wherein M is ammonium, $R_7$ is nonyl, and n is about 10 to about 30, such as the compounds available from Dai-Ichi Kogyo Seiyaku Co., Ltd. (Tokyo, Japan) under the tradename Hitenol BC.

The polyoxyalkylene-1-(allyloxymethyl) alkyl ether sulfate salt compounds that can be employed as water-soluble or water-dispersible polymerizable surfactants according to the invention include those disclosed in Japanese Patent No. JP 2596441 B2 (Dai-Ichi Kogyo Seiyaku Co., Ltd.).

Suitable polyoxyalkylene-1-(allyloxymethyl) alkyl ether sulfate salt compounds include compounds having the formula:

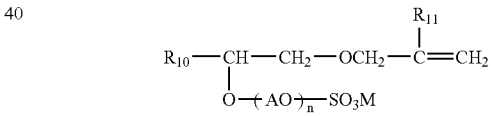

wherein $R_{10}$ is a linear or branched alkyl group containing 8 to 30 carbon atoms, preferably 8 to 14 carbon atoms, and more preferably 10 to 12 carbon atoms; $R_{11}$ is hydrogen or methyl, preferably hydrogen; A is an unsubstituted or substituted alkylene group having 2 to 4 carbon atoms; n is 0 or an integer of 1 to about 200, preferably 2 to about 100, more preferably 2 to about 30; and M is an alkali metal, an ammonium ion, or an alkanolamine residue. Examples of alkanolamine residues include monoethanolamine, triethanolamine, and the like.

For A, suitable unsubstituted or substituted alkylene groups include, for example, ethylene, propylene, butylene, and isobutylene. The polyoxyalkylene group —$(AO)_n$— can be a homo-, block or random polymer, or a mixture thereof.

The polyoxyalkylene-1-(allyloxymethyl) alkyl ether sulfate salt compounds of the invention can be prepared according to the methods described in Japanese Patent No. JP 2596441 B2.

A currently preferred group of polyoxyalkylene-1-(allyloxymethyl) alkyl ether sulfate salt compounds are those compounds having the formula:

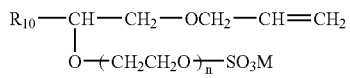

wherein $R_{10}$ is an alkyl group containing 8 to 14 carbon atoms, and preferably 10 to 12 carbon atoms; n is an integer of 1 to about 200, preferably 2 to about 100, more preferably 2 to about 30; and M is an alkali metal, an ammonium ion, or an alkanolamine residue. More preferred compounds are those wherein $R_{10}$ is a decyl or dodecyl group, n is 5 to 10, and M is $NH_4$, such as the compounds available from Dai-Ichi Kogyo Seiyaku Co., Ltd. (Tokyo, Japan) under the trademark Hitenol® KH.

The total amount of water-soluble or water-dispersible polymerizable surfactant utilized in the process, e.g. added in steps (a) and (b) of the process, based on the total weight of monomers (i), (ii) and (iii) is about 0.1 to about 5 wt. %, preferably about 0.5 to about 2 wt. %.

The amount of water-soluble or water-dispersible polymerizable surfactant added to the mixture of water, polymerizable surfactant, and polymerization initiator is that amount effective to produce a latex emulsion having particles having an average particle size of less than or equal to 200 nm, preferably less than or equal to 100 nm. The effective amount needed to obtain the required particle size will be dependent on operating conditions known in the art to have an affect on particle size, including agitation (shear), viscosity, and the like. The remainder of the polymerizable surfactant is added with monomers (i), (ii) and (iii). In a preferred embodiment of the invention, the amount of polymerizable surfactant added to the mixture of water, polymerizable surfactant, and polymerization initiator is at least about 20 wt. % of the total amount of polymerizable surfactant added in steps (a) and (b). In the preferred embodiment of the invention, the amount of polymerizable surfactant added with monomers (i), (ii) and (iii) is less than about 80 wt. % of the total amount of polymerizable surfactant added in steps (a) and (b).

The process(es) of the invention also utilizes at least one water-soluble polymerization initiator. Any conventional water-soluble polymerization initiator that is normally acceptable for emulsion polymerization of acrylate monomers may be used and such polymerization initiators are well known in the art. The typical concentration of water-soluble polymerization initiators is about 0.01 wt. % to about 1 wt. %, preferably about 0.01 wt. % to about 0.5 wt. %, of the total weight of monomers (i), (ii) and (iii) charged in the pre-emulsion. The water soluble polymerization initiators can be used alone or used in combination with one or more conventional reducing agents, such as bisulfites, metabisulfites, ascorbic acid, sodium formaldehyde sulfoxylate, ferrous sulfate, ferrous ammonium sulfate, ferric ethylene-diamine-tetraacetic acid, and the like. Water-soluble polymerization initiators that can be employed according to the invention include water soluble persulfates, peroxides, azo compounds and the like, and mixtures thereof. Examples of water soluble initiators include, but are not limited to, persulfates (e.g. potassium persulfate, and sodium persulfate), peroxides (e.g. hydrogen peroxide, and tert-butyl hydroperoxide), and azo compounds (e.g. 4,4'-azobis(4-cyano-pentanoic acid), V-501 from Wako Chemicals). Currently the preferred water soluble polymerization initiators are the persulfates, particularly potassium persulfate.

The polymerization can be initiated by any conventional method known to those skilled in the art, such as by application of heat or radiation. The method of initiation will be dependent on the water-soluble polymerization initiator used and will be readily apparent to those skilled in the art.

The water soluble polymerization initiator can be added to the polymerization reaction in any conventional manner known in the art. It is currently preferred to add a portion of the initiator to the initial reactor charge which comprises water, an effective amount of the water-soluble or water-dispersible polymerizable surfactant, and an initial amount of the polymerization initiator. The remainder of the initiator can be added continuously or incrementally during the emulsion polymerization. It is currently preferred to incrementally add the remaining initiator.

Following polymerization, the pH of the latex emulsion is adjusted by contacting the latex emulsion with a suitable base in an amount necessary to raise the pH to about 6.5 to about 9, preferably about 7 to about 8. Examples of suitable bases for adjusting the pH of the latex emulsion include alkali metal hydroxides, alkaline earth metal hydroxides, ammonium hydroxide, amines, and the like, and mixtures thereof. The currently preferred base for use in the invention is ammonium hydroxide.

The latex emulsion typically has a solids content of from about 40 to about 70 wt. %, preferably about 45 to about 55 wt. %, and more preferably about 46 to about 48 wt. %.

In an optional, but currently preferred, embodiment of the invention, the processes of the invention further comprise the addition of a vinyl ester of a $C_2$ to $C_{12}$ aliphatic carboxylic acid to the latex emulsion after the conversion of monomers (i), (ii) and (iii) is greater than 90%, preferably greater than 95%, and more preferably greater than 97%. Typically, this can be accomplished in the processes of the invention by adding the vinyl ester to the latex emulsion after the addition of monomers (i), (ii) and (iii) is completed.

Examples of suitable vinyl esters for use in the processes of the invention include, but are not limited to, vinyl acetate, vinyl propionate, vinyl butyrate, vinyl isobutyrate, vinyl 2-ethylhexanoate, vinyl laurate, the vinyl esters of neo-acids (available from Resolution Performance Products under the trademark VeoVa™), and the like, and mixtures thereof. The preferred vinyl esters are those that have a reactivity similar to the reactivity of the water-soluble or water-dispersible polymerizable surfactant.

The amount of vinyl ester added to the latex emulsion is about 0.1 to about 1 wt. %, preferably about 0.2 to about 0.8 wt. %, of the total weight of monomers (i), (ii) and (iii) charged to the polymerization.

If a vinyl ester is used in the processes of the invention, it is currently preferred that additional polymerization initiator be added at the time of addition of the vinyl ester.

The polymerization reaction can be conducted in any conventional reaction vessel capable of an emulsion polymerization.

The polymerization can be conducted at a temperature typical for emulsion polymerizations. The polymerization is preferably conducted at a temperature in the range of about 50° C. to about 95° C., preferably in the range of about 60° C. to about 85° C.

The polymerization time is that time needed to achieve the desired conversion based on the other reaction conditions, e.g. temperature profile, and reaction components, e.g. monomers, initiator, etc. The polymerization time will be readily apparent to those skilled in the art.

A third embodiment of the invention relates to pressure sensitive adhesive compositions having enhanced resistance to water-whitening comprising an aqueous emulsion polymer are provided, the polymer comprising the polymerization reaction product of a polymerizable aqueous emulsion comprising: (i) at least one hydrophobic alkyl acrylate or alkyl methacrylate ester of an alcohol, (ii) at least about 1 wt. % of at least one hydrophilic monomer, (iii) at least about 5 wt. % of at least one partially hydrophilic alkyl acrylate or alkyl methacrylate ester of an alcohol, and (iv) a water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii); wherein after the polymerization the pH of the polymer is adjusted to a pH of about 6.5 to about 9, and the average particle size of the polymer is less than or equal to 200 nm, preferably less than or equal to 100 nm.

In an optional, but currently preferred, embodiment of the invention, the PSA compositions of the invention further comprise a vinyl ester of a $C_2$ to $C_{12}$ aliphatic carboxylic acid, the vinyl ester having been added to the latex emulsion after the conversion of monomers (i), (ii) and (iii) is greater than 90%, preferably greater than 95%, and more preferably greater than 97%.

EXAMPLES

| Abbreviations and Source of Materials | |
| --- | --- |
| 2-EHA: | 2-ethylhexyl acrylate; Ashland Inc. |
| BA: | butyl acrylate; Ashland Inc. |
| MA: | methyl acrylate; Ashland Inc. |
| iOA: | isooctyl acrylate; Ashland Inc. |
| MMA: | methyl methacrylate; Ashland Inc. |
| AA: | acrylic acid; Ashland Inc. |
| MAA: | methacrylic acid; Ashland Inc. |
| Polystep NMS-7 | allylammonium laureth-3-sulfate; Stepan Company |
| Polystep NMS-5 | allylammonium lauryl sulfate; Stepan Company |
| Hitenol BC-2029: | 20% active in water, n is about 20; 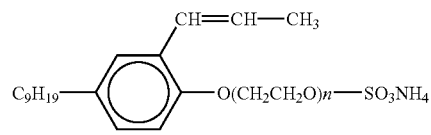 Dai-Ichi Kogyo Seiyaku Co., Ltd. |
| VeoVa 5: | vinyl ester of neopentanoic acid; Resolution Performance Products |
| PPS: | potassium persulfate; Sigma-Aldrich Co. |
| $NH_4OH$: | Ammonium hydroxide (28%); Sigma-Aldrich Co. |
| Abex: EP-120 | sulfated nonylphenoxy-poly(ethyleneoxy)ethanol; Rhodia |
| AOT-75: | sodium dioctyl sulfosuccinate; Cytec |
| Igepal: Co-630 | nonylphenol ethoxylate (with 9 moles of ethylene oxide); Rhodia |
| Mylar: | polyester film; DuPont |
| Poly H9: | release liner; Rexam Release |
| Hitenol KH-05: | Polyoxyethylene-1-(allyloxymethyl) alkyl ether sulfate, ammonium salt; Dai-Ichi Kogyo Seiyaku Co., Ltd. |

Example 1

In a 2 L jacketed glass reactor equipped with a reflux condenser, thermocouple and twin blade agitator, 701.5 g of polyacrylate latex was prepared. Monomer pre-emulsion was prepared by mixing 110 g water, 192.4 g 2-EHA, 64 g BA, 45 g MA, 6.25 g MAA, and 9.75 g AA with 9.27 g Polystep NMS-7. The reactor was charged with 140 g of water and 3 g of Polystep NMS-7. Separately, 117 g of PPS stock solution (0.94 wt. % concentration) was prepared in water. The reactor was heated with water. When the temperature reached 79° C., 0.75 g PPS was added followed by continuous addition of the monomer pre-emulsion at a 2.1–2.2 g/min rate for 3.5 hr. The temperature was maintained at 83° C. and the polymerization charge agitated continuously at 240 rpm. Every 20 min, 10 g of the PPS stock solution was added to the reactor. After the pre-emulsion addition was complete, the reactor temperature was raised to 85° C. and agitated for an additional 40 min after which 1.5 g VeoVa 5 was added to the reactor with 5 g of PPS stock solution.

The latex has 47.2% solids. The wt. % solids was determined by placing a known amount of latex into a weighed aluminum weighing tin, drying at 150° C. for 60 min, weighing the tin again and calculating the solids content. The average particle size is 80 nm as measured using a Horiba laser scattering particle size distribution analyzer model LA-910. The pH was 2.34 as measured using an Orion model 250 pH meter. The Brookfield viscosity is 860 cp using a Brookfield viscometer LV II+ with spindle #3 at 30 rpm.

The latex was then neutralized with $NH_4OH$ to a pH of 7.85.

The neutralized latex was direct coated on a 1 mil Mylar film as well as on Poly H9 release liner. Both films were air dried for 10 min and heat dried at 90° C. for 5 min. The coated Mylar was laminated with release liner (direct coat), and the coated release liner was laminated with Mylar (transfer coat). For water whitening/water immersion tests, the release liners were removed thus exposing the polymer surfaces to water. UV/Visible spectroscopy (UV/VIS) using a Cintra 40 UV-Visible spectrophotometer was used to determine absorbance. The coated Mylar film (facestock) was placed in a cuvette which was filled with water at time=0. The light absorbance was measured and recorded for 24 hr at 400 nm (room temperature). The final absorbance increase of the direct- and transfer-coated films was 0.015 and 0.041 respectively (curves #1 and 2 in FIG. 1).

Example 2 (Control)

In a control experiment, latex was prepared according to the procedure described in Example 1 except conventional surfactants were used in place of the Polystep NMS-7. Thus, 5.3 g Abex EP-120 (30% solids) was used in the initial reactor charge, and 3.2 g Abex EP-120, 0.78 g AOT 75, and 3.88 g Igepal Co-630 was used to stabilize the pre-emulsion. The final latex had an average particle size of 87 nm, 46.9% solids, pH=2.24, and Brookfield viscosity of 546. The latex was neutralized to pH 7.84. The latex film was direct coated as described in Example 1, and the UV/VIS absorbance was measured in room temperature water during a 24 hr immersion test. The final absorbance was 0.388 (curve #3 in FIG. 1).

The results of Examples 1 and 2 demonstrate that the PSAs of the invention have significantly improved resistance to water-whitening compared to a similar polymer prepared using conventional surfactants.

Example 3

A polymerization was carried out according to the procedure described in Experiment 1 except instead of 2-EHA, 192 grams of iOA was emulsified with BA, MA, AA, and MAA.

The latex had 47.5% solids. The average particle size was 98 nm and pH=2.23. Brookfield viscosity was 740 cp. The latex was neutralized to a pH of 7.98 with $NH_4OH$.

Latex film was prepared by direct coating on Mylar at 1 mil coat weight. The change of absorbance after 24 hr room temperature immersion was 0.039.

Example 4

A polymerization was carried out according to the procedure described in Experiment 1 except 16 grams of AA was emulsified with 192 grams of 2-EHA, 64 grams of BA, and 45 grams of MA. The polymerization conditions were identical to those described in Example 1. The latex had 45.4% solids, pH=2.38 and Brookfield viscosity was 572. Average particle size was 77 nm. The latex was neutralized to a pH of 7.8 using $NH_4OH$.

The direct coated film on Mylar has 0.046 absorbance increase after the 24 hr room temperature water immersion test.

Example 5

A polymerization was carried out according to the procedure described in Experiment 1 except 45 grams of MMA was emulsified with the described amounts of 2-EHA, BA, AA, and MAA. The latex had 45.91% solids, pH=2.41, and Brookfield viscosity is 678. The average particle size was 93 nm. The latex was neutralized with $NH_4OH$ to pH=7.95.

The latex film was prepared by direct coating on Mylar as described in Example 1 and tested for water whitening. The absorbance increase after 24 hr in room temperature water is 0.024.

Example 6 (Comparative)

A polymerization was carried out according to the procedure described in Experiment 1 except no partially water soluble monomer i.e., methyl acrylate or methyl methacrylate, was used. Thus, the pre-emulsion consisted of 217 grams of 2-EHA, 84 grams of BA, 6.4 grams of MAA, and 9.1 grams of AA emulsified in 110 grams of water with 12.9 grams of Polystep NMS-7. The latex had 46% solids, pH=2.39, and Brookfield viscosity was 380. The average particle size was 106 nm. The latex was neutralized to pH=7.98 using $NH_4OH$.

The latex film was direct coated on Mylar. The absorbance increase of the latex film after 24 hr room temperature water immersion was 0.38.

The results of Example 6 demonstrate that polymerization without partially water soluble monomer produces PSA with unacceptable water whitening.

Example 7 (Comparative)

A polymerization was carried out according to the procedure described in Experiment 1 except 1 gram of Polystep NMS-7 was added to the initial reactor charge.

The latex had 47.1 solids, pH=2.76, and Brookfield viscosity was 348 cp. The average particle size was 119 nm. The latex was neutralized to pH=7.54 with $NH_4OH$ and direct coated on Mylar. The absorbance increase after 24 hr, room temperature water immersion was 0.13.

The results of Example 7 demonstrate that polymerization with less than an effective amount of polymerizable surfactant in the initial reactor charge produces PSA with unacceptable water whitening and particles with too large of an average particle size.

Example 8

A polymerization was carried out according to the procedure described in Experiment 1 except instead of adding 3 grams of Polystep NMS-7, 4.33 grams of Polystep NMS-5 was added to the initial reactor charge. Also, the monomer mixture was emulsified with 17.9 grams of Polystep NMS-5.

The latex had 46.5% solids. The particle size was 78 nm, and pH=2.64. The latex was neutralized with $NH_4OH$ to pH=7.49, and coated directly on Mylar.

The absorbance increase after 24 hr. room temperature water immersion test is 0.05.

Example 9

In a 2 L jacketed glass reactor equipped with a reflux condenser, thermocouple and twin blade agitator, a polyacrylate latex was prepared. In a separate vessel, monomer pre-emulsion was prepared by mixing 122.8 g water, 298 g 2-EHA, 99.1 g BA, 69.75 g MA, 10.06 g MAA, and 14.08 g AA with 14.75 g Hitenol BC-2020. The reactor was charged with 296.72 g of water, 1.18 g PPS, and 7.37 g of Hitenol BC-2020. Separately, 61.77 g of PPS stock solution (0.94 wt. % concentration) was prepared in water. The reactor was heated with water. When the temperature reached 79° C., continuous addition of the monomer pre-emulsion at a 3 g/min rate was started and continued for 200 minutes. The temperature was maintained at 83° C. and the polymerization charge agitated continuously at 240 rpm. Every 20 min for the 200 minute pre-emulsion addition time beginning 20 minutes after the start of the pre-emulsion addition, 6 g of the PPS stock solution was added to the reactor. After the pre-emulsion addition was complete, the reactor temperature was raised to 88° C. and agitated for an additional 60 minutes.

The latex has 46.79% solids. The wt. % solids was determined by placing a known amount of latex into a weighed aluminum weighing tin, drying at 150° C. for 60 min, weighing the tin again and calculating the solids content. The average particle size is 86 nm as measured using a Horiba laser scattering particle size distribution analyzer model LA-910. The pH was 2.34 as measured using an Orion model 250 pH meter. The Brookfield viscosity is 1124 cp using a Brookfield viscometer LV II+ with spindle #3 at 30 rpm.

The latex was then neutralized with $NH_4OH$ to a pH of 7.85.

The neutralized latex was direct coated on a 1 mil Mylar film. The film was air dried for 10 min and heat dried at 90° C. for 5 min. The coated Mylar was laminated with release liner (direct coat). For water whitening/water immersion tests, the release liners were removed thus exposing the polymer surfaces to water. UV/Visible spectroscopy (UV/VIS) using a Cintra 40 UV-Visible spectrophotometer was used to determine absorbance. The coated Mylar film (facestock) was placed in a cuvette which was filled with water at time=0. The light absorbance was measured and recorded for 24 hr at 400 nm (room temperature). The final absorbance increase of the direct-coated film was 0.005 which corresponds to 98.8% light transmission.

Example 10

In a 2 L jacketed glass reactor equipped with a reflux condenser, thermocouple and twin blade agitator, a polyacrylate latex was prepared. In a separate vessel, monomer pre-emulsion was prepared by mixing 134.5 g water, 271.9 g 2-EHA, 90.7 g BA, 63.6 g MA, 9.1 g MAA, and 12.9 g AA with 5.4 g Hitenol KH-05. The reactor was charged with 364.4 g of water, 1.57 g PPS, and 1.35 g of Hitenol KH-05. Separately, 35.5 g of PPS stock solution (2.5 wt. % concentration) was prepared in water. The reactor was heated with water. When the temperature reached 79° C., continuous addition of the monomer pre-emulsion at a 2.94 g/min rate was started and continued for 200 minutes. The temperature was maintained at 83° C. and the polymerization charge agitated continuously at 240 rpm. Every 20 min for the 200 minute pre-emulsion addition time beginning 20 minutes after the start of the pre-emulsion addition, 3.5 g of the PPS stock solution was added to the reactor. After the pre-emulsion addition was complete, the reactor temperature was raised to 88° C. and agitated for an additional 60 minutes. The latex had 45.8% solids. The wt. % solids was determined by placing a known amount of latex into a weighed aluminum weighing tin, drying at 150° C. for 60 min, weighing the tin again and calculating the solids content. The average particle size was 76 nm as measured using a Horiba laser scattering particle size distribution analyzer model LA-910. The pH was 2.2 as measured using an Orion model 250 pH meter. The Brookfield viscosity was 1200 cp using a Brookfield viscometer LV II+ with spindle #3 at 30 rpm.

The latex was then neutralized with $NH_4OH$ to a pH of 7.12.

The neutralized latex was direct coated on a 1 mil Mylar film. The film was air dried for 10 min and heat dried at 90° C. for 5 min. The coated Mylar was laminated with release liner (direct coat). For water whitening/water immersion tests, the release liner was removed thus exposing the polymer surface to water. UV/Visible spectroscopy (UV/VIS) using a Cintra 40 UV-Visible spectrophotometer was used to determine absorbance. The coated Mylar film (facestock) was placed in a cuvette which was filled with water at time=0. The light absorbance was measured and recorded for 24 hr at 400 nm (room temperature). The final absorbance increase of the direct-coated film was 0.014. The adhesive was also exposed to 190° F. water for 10 minutes. After the high temperature exposure, the no visible color change.

We claim:

1. A pressure sensitive adhesive composition having enhanced resistance to water-whitening comprising an aqueous emulsion polymer, said polymer comprising the polymerization reaction product of a polymerizable aqueous emulsion comprising: (i) at least one hydrophobic alkyl acrylate or alkyl methacrylate ester of an alcohol, (ii) at least about 1 wt. % of at least one hydrophilic monomer, (iii) at least about 5 wt. % of at least one partially hydrophilic alkyl acrylate or alkyl methacrylate ester of an alcohol, and (iv) a water-soluble or water-dispersible polymerizable surfactant selected from polyoxyalkylene-1-(allyloxymethyl) alkyl ether sulfate salts, wherein the wt. % of monomers (i), (ii) and (iii) are based on the total weight of monomers (i), (ii) and (iii) in said emulsion; wherein after said polymerization the pH of said polymer is adjusted to a pH of about 6.5 to about 9, and the average particle size of said polymer is less than or equal to 200 nm.

2. The composition of claim 1 wherein the amount of monomer (i) in said emulsion is about 70 to about 90 wt. %.

3. The composition of claim 2 wherein the amount of monomer (i) in said emulsion is about 75 to about 85 wt. %.

4. The composition of claim 1 wherein to amount of monomer (ii) in said emulsion is about 2 to about 10 wt. %.

5. The composition of claim 4 wherein the amount of monomer (ii) in said emulsion is about 4 to about 8 wt. %.

6. The composition of claim 1 wherein the amount of monomer (iii) in said emulsion is about 5 to about 20 wt. %.

7. The composition of claim 6 wherein the amount of monomer (iii) in said emulsion is about 5 to about 18 wt. %.

8. The composition of claim 1 wherein said pressure sensitive adhesive has an average particle size of less than or equal to 100 nm.

9. The composition of claim 1 wherein said monomer (i) is at least one hydrophobic alkyl acrylate or alkyl methacrylate ester of an alcohol wherein the alkyl portion contains at least 4 carbon atoms.

10. The composition of claim 9 wherein said monomer (i) is selected from isooctyl acrylate, 4-methyl-2-pentyl acrylate, 2-methylbutyl acrylate, isoamyl acrylate, secbutyl acrylate, n-butyl acrylate, 2-ethylhexyl acrylate, isodecyl methacrylate, isononyl acrylate, isodecyl acrylate, or mixtures thereof.

11. The composition of claim 10 wherein said monomer (i) is selected from n-butyl acrylate, 2-ethylhexyl acrylate, or mixtures thereof.

12. The composition of claim 1 wherein said monomer (ii) is selected from a monoolefinic monocarboxylic acid, a monoolefinic dicarboxylic acid, or mixtures thereof.

13. The composition of claim 12 wherein said monomer (ii) is selected from acrylic acid, methacrylic acid, fumaric acid, maleic acid, itaconic acid, crotonic acid, or mixtures thereof.

14. The composition of claim 13 wherein said monomer (ii) is selected from acrylic acid, methacrylic acid, or mixtures thereof.

15. The composition of claim 1 wherein said monomer (iii) is selected from methyl acrylate, methyl methacrylate, ethyl acrylate, or mixtures thereof.

16. The composition of claim 15 wherein said monomer (iii) is selected from methyl acrylate, methyl methacrylate, or mixtures thereof.

17. The composition of claim 1 wherein the total amount of water-soluble or water-dispersible polymerizable surfactant present during the polymerization is about 0.1 to about 5 wt. % of the total weight of monomers (i), (ii) and (iii) in said emulsion.

18. The composition of claim 17 wherein the total amount of water-soluble or water-dispersible polymerizable surfactant present during the polymerization is about 0.5 to about 2 wt. % of the total weight of monomers (i), (ii) and (iii) in said emulsion.

19. The composition of claim 17 wherein the amount of water-soluble or water-dispersible polymerizable surfactant added with said monomers (i), (ii) and (iii) is less than about 80 wt. % of the total amount of water-soluble or water-dispersible polymerizable surfactant present during the polymerization.

20. The composition of claim 1 wherein the total amount of polymerization initiator added is about 0.01 to about 0.5 wt. % of the total weight of monomers (i), (ii) and (iii) in said emulsion.

21. The composition of claim 1 which further comprises a vinyl ester of a $C_2$ to $C_{12}$ carboxylic acid that is added after the conversion of monomers (i), (ii) and (iii) is greater than 90%.

22. The composition of claim 21 which further comprises a vinyl ester of a $C_2$ to $C_{12}$ carboxylic acid that is added after the conversion of monomers (i), (ii) and (iii) is greater than 95%.

23. A pressure sensitive adhesive composition having enhanced resistance to water-whitening comprising an aqueous emulsion polymer, said polymer comprising the polymerization reaction product of a polymerizable aqueous emulsion comprising: (i) about 70 to about 90 wt. % of at least one hydrophobic alkyl acrylate ester selected from n-butyl acrylate, 2-ethylhexyl acrylate, or mixtures thereof, (ii) about 2 to about 10 wt. % of at least one hydrophilic monomer selected from acrylic acid, methacrylic acid, or mixtures thereof, (iii) about 5 to about 20 wt. % of methyl acrylate, and (iv) a water-soluble or water-dispersible polymerizable surfactant selected from polyoxyalkylene-1-(allyloxymethyl) alkyl ether sulfate salts, wherein the wt. % of monomers (i), (ii) and (iii) are based on the total weight of monomers (i), (ii) and (iii) in said emulsion;

wherein after said polymerization the pH of said polymer is adjusted to a pH of about 6.5 to about 9, and the average particle size of said polymer is less than or equal to 200 nm.

\* \* \* \* \*